June 26, 1934.  H. N. OTT  1,964,075

MEANS FOR REFLECTING LIGHT

Filed July 3, 1930  4 Sheets-Sheet 1

INVENTOR.
Harvey N Ott
by Parker & Pinkney
ATTORNEYS.

June 26, 1934.  H. N. OTT  1,964,075
MEANS FOR REFLECTING LIGHT
Filed July 3, 1930   4 Sheets-Sheet 2
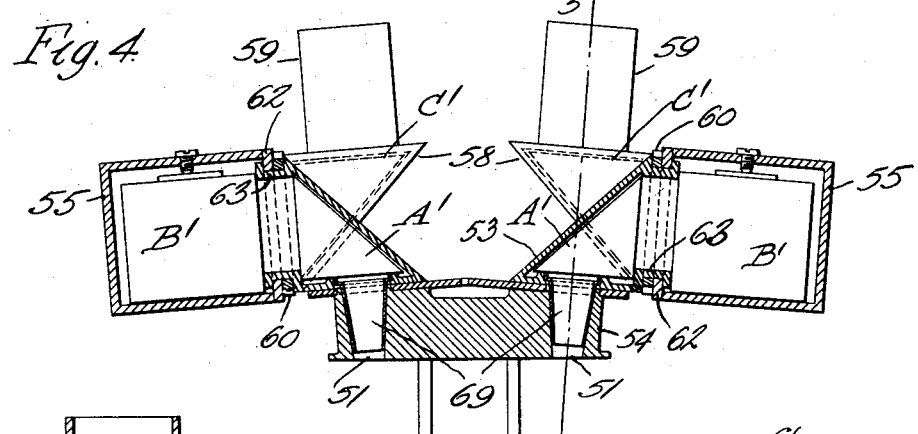
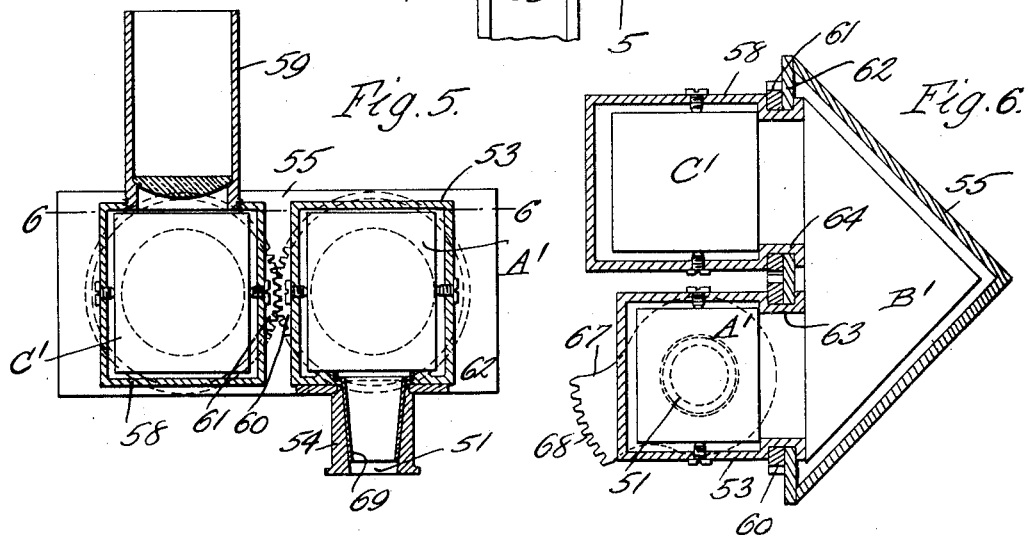
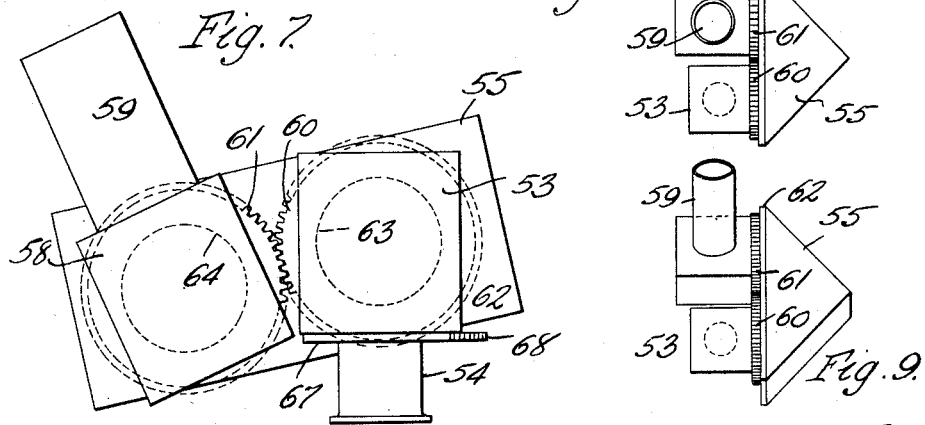
INVENTOR.
Harvey N. Ott
by Parker & Pinchnow
ATTORNEYS.

June 26, 1934.   H. N. OTT   1,964,075
MEANS FOR REFLECTING LIGHT
Filed July 3, 1930   4 Sheets-Sheet 3
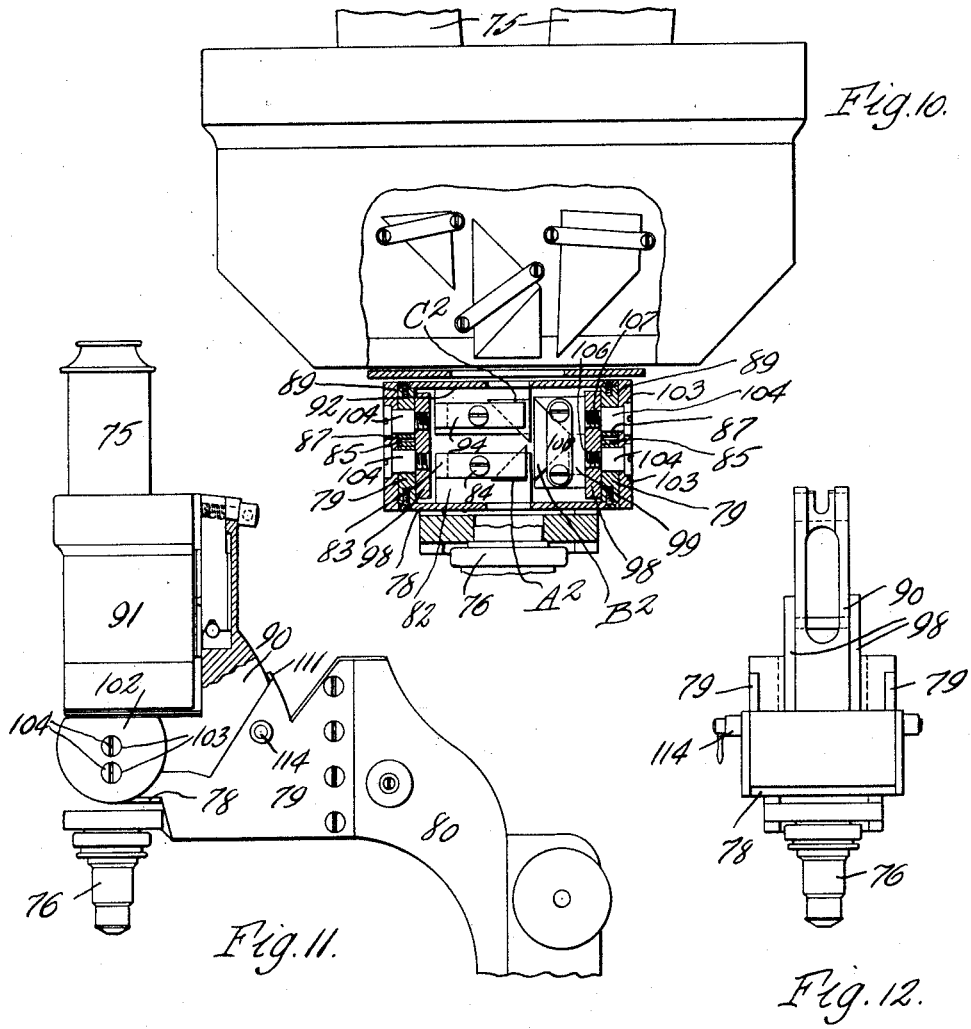
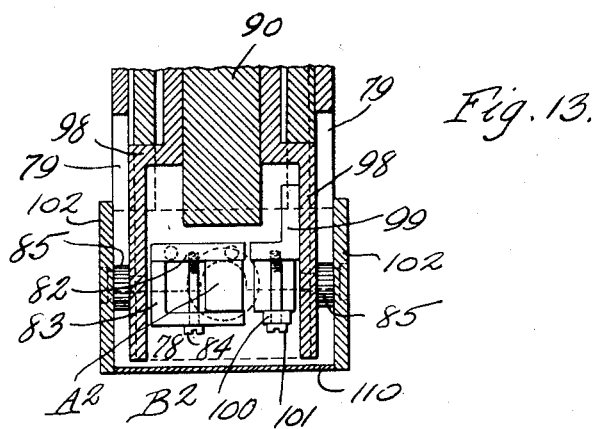
INVENTOR.
Harvey N. Ott
by Parker & Prahnow
ATTORNEYS.

June 26, 1934.    H. N. OTT    1,964,075
MEANS FOR REFLECTING LIGHT
Filed July 3, 1930    4 Sheets-Sheet 4

INVENTOR.
Harvey N. Ott
by Parker & Crochnow
ATTORNEYS.

Patented June 26, 1934

1,964,075

UNITED STATES PATENT OFFICE 1,964,075

MEANS FOR REFLECTING LIGHT

Harvey N. Ott, Buffalo, N. Y., assignor to Spencer Lens Company, Buffalo, N. Y.

Application July 3, 1930, Serial No. 465,483

22 Claims. (Cl. 88—39)

This invention relates to improvements in optical instruments, such as microscopes, telescopes and the like, and more particularly to means for use in connection with instruments of this kind, whereby light rays passing from an objective in one direction, are deflected at an angle to said direction.

In certain types of optical instruments where the objective must be maintained in a definite position, it is at times very inconvenient to use such instruments, if the eye piece tube or tubes are at all times in alinement with the objective. By inserting a penta-prism between the objective and the eye piece, as has heretofore been done, it is possible to place the eye piece at an angle to the objective, but with the use of a device of this kind, the erection of an image reversed by the objective cannot be accomplished, nor can the angle between the objective and ocular be varied.

The objects of this invention are to provide means whereby the eye piece of an optical instrument may be arranged at an angle to the objective, without distorting the image, or turning the same about the optical axis; also to provide means of this kind of improved construction, whereby light in passing from the objective to the eye piece, is reflected a number of times by means of reflecting surfaces, arranged in such angular relation to each other as to transmit light to the eye at an angle to the optical axis of the objective; also to embody means of this kind in a supporting structure, whereby the eye piece member may be placed at will to various angular relations to the objective; also to improve the construction of optical instruments of this kind in other respects hereinafter specified.

The invention is illustrated in the accompanying drawings as used in connection with microscopes, but it will be understood that it is not intended to restrict the invention to such use, since it will be obvious that the invention may be used equally well in connection with other types of optical instruments.

In the accompanying drawings:

Fig. 4 is a front view, partly in section, of the upper portion of a microscope of modified construction, by means of which the eye piece may be adjusted to different angular relations to the objective;

Fig. 5 is a sectional elevation thereof, on line 5—5, Fig. 4, approximately;

Fig. 6 is a sectional plan view thereof, on line 6—6, Fig. 5;

Fig. 7 is a side elevation thereof, showing the eye piece tube turned at an angle to the objective;

Figs. 8 and 9 are diagrammatic top views of a single eye piece of the microscope, and showing the eye piece and reflecting surfaces in two different positions relatively to the objective;

Fig. 10 is a rear elevation, partly in section, of a binocular mon-objective microscope, having applied thereto my improved construction for making the eye pieces adjustable to different angular relations to the objective;

Fig. 11 is a side elevation thereof, on a slightly smaller scale, showing a portion thereof in section;

Fig. 12 is a front elevation of the portion of the microscope shown in Fig. 11, but having the eye pieces removed therefrom;

Fig. 13 is a sectional view, on an enlarged scale, on line 13—13, Fig. 14;

Figures 1, 2:
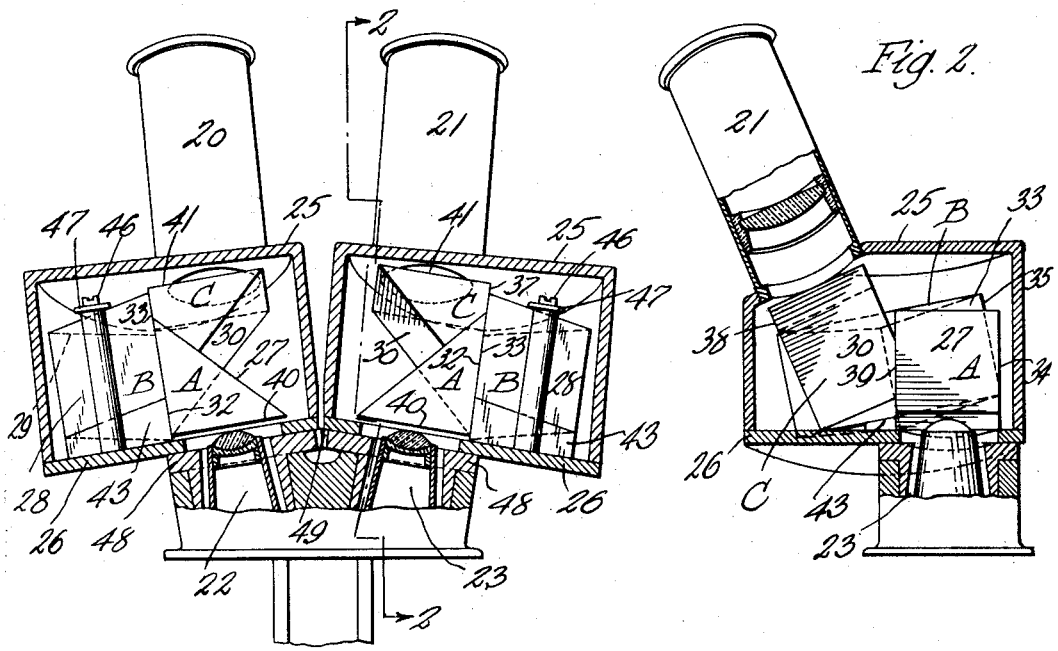
Fig. 1 is a front view, partly in section, of the upper portion of a microscope embodying this invention.
Fig. 2 is an elevation thereof, partly in section, on line 2—2, Fig. 1.
Figure 3:
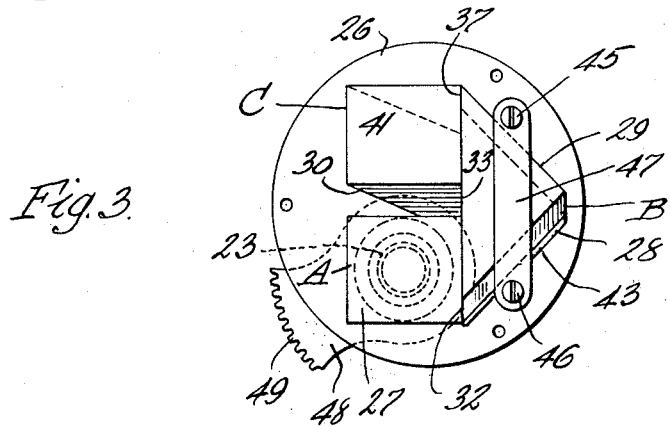
Fig. 3 is a top plan view of one of the sets of prisms, by means of which a beam of light from the objective is directed through the eye piece at an angle to the objective.
Figure 14:
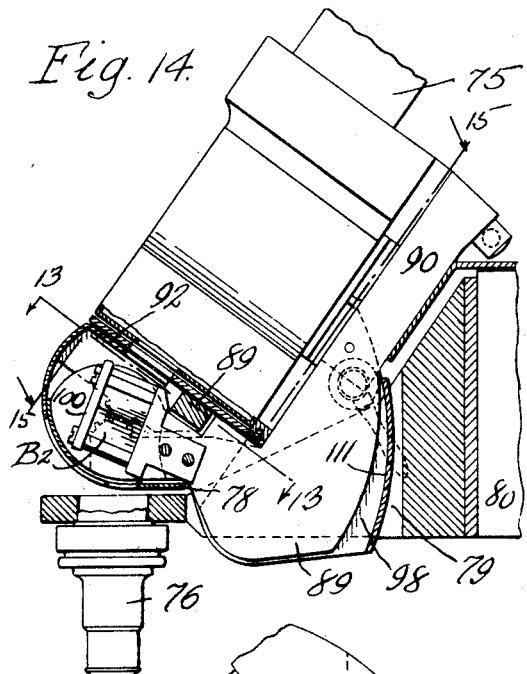
Fig. 14 is a side elevation of the microscope, showing in section the mechanism for permitting adjustment of the eye piece tubes with reference to the objective.
Figure 15:
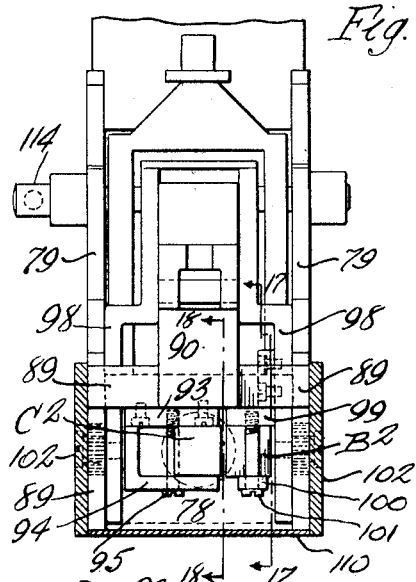
Fig. 15 is an elevation thereof, partly in section, on line 15—15, Fig. 14.
Figure 16:
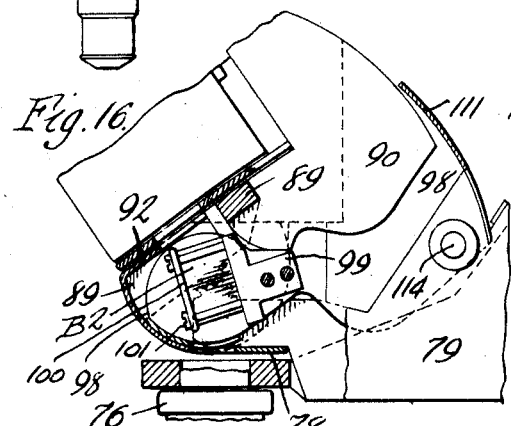
Fig. 16 is a fragmentary side elevation, partly in section, similar to Fig. 14, but showing the parts in different positions relatively to the objective.
Figure 17:
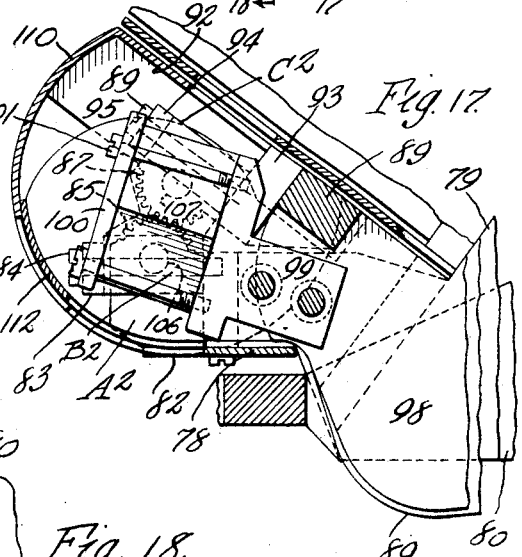
Fig. 17 is a sectional elevation thereof, on line 17—17, Fig. 15.
Figure 18:
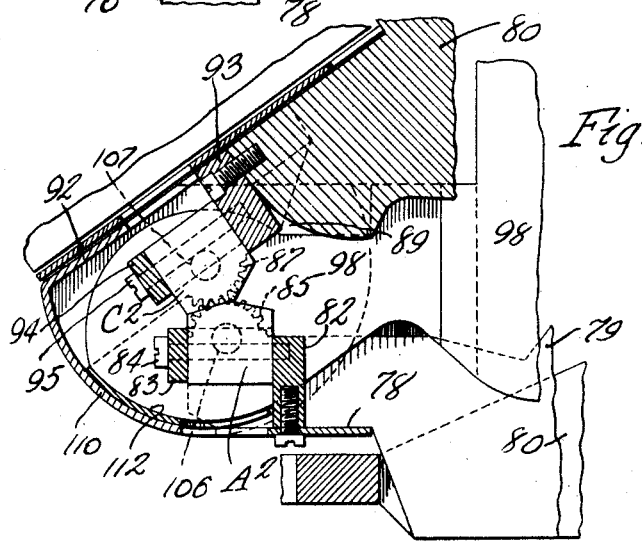
Fig. 18 is a section thereof, on line 18—18, Fig. 15.

One embodiment of my invention is illustrated in Figs. 1 to 3 for use in connection with a binocular microscope having two objectives. In this construction, 20 and 21 represent the two eye piece tubes of the microscope, and 22 and 23 represent the upper portions of the objective tubes. The structure of the objectives and eye pieces may be of any suitable or desired kind.

In order to transmit light from the objectives to the eye pieces, a series of three prisms A, B, and C are employed, arranged in a suitable prism housing, to one wall 25 of which the eye piece tube may be secured. The opposite wall 26 may be used to support the reflecting surfaces or prisms by means of which light is reflected from the objective to the eye piece. Since these prisms and housings are complementary for each eye piece tube, only one set of prisms and housing will be described.

In this particular construction, four reflecting surfaces are employed, and when prisms are used, all of these prisms may be right-angled triangular prisms, each having one of its faces arranged at an angle of 45° to the other two faces. Prisms with their faces arranged in different angular relations may, however, be used. All of the three prisms in the construction shown in Figs. 1 to 3 are suitably secured or cemented together.

The arrangement of the prisms is such that the image forming rays from the objective are reflected by the face 27 of the prism A to a face 28 of the prism B, from which they are reflected to the other face 29 of the same prism, and then to the face 30 of the prism C, from which they are reflected through the eye piece tube. In order to obtain the difference in angles between the objective and the eye piece tube, the prisms are arranged in varying angular relations to each other, so as to provide for the desired angle of the eye piece relatively to the objective.

The reflecting surfaces are arranged in such a manner that when the image forming rays from the objective are to be reflected through a certain angle in passing from the objective to the ocular, one half of this angle is taken care of by one pair of the reflecting surfaces, and the other half by another pair of reflecting surfaces.

The reason for this arrangement is that ordinarily, when image forming rays are reflected from an objective to an eye piece arranged at an angle to the objective by two reflecting surfaces standing at an angle each to the other in more than one plane, the image appears to be turned about the optical axis of the objective through an angle substantially equal to that between the optical axes of the objective and ocular. By my improved construction, this turning of the image about the optical axis of the objective is avoided, since the image is turned through half of this angle by one pair of the reflecting surfaces, and then by being reflected again through the same angle after the light is turned in the opposite direction, the image is turned again in the opposite direction a like amount, so that one pair of reflecting surfaces compensates for the turning effect of the other pair of reflecting surfaces.

In the construction shown in the accompanying drawings, this result is produced by turning in the plane of desired change of direction, the first pair of reflecting surfaces with reference to each other through one half of the angle between the objective and the eye piece, and by turning the last two reflecting surfaces with reference to each other through the other half of this angle. As is clearly shown in Figs. 1 to 3, the face 32 of the prism A is secured to or arranged parallel with one side of the face 33 of the prism B, and these prisms are turned relatively to each other so that the edge 34 of the face 32 is arranged at an angle to the edge of the face 33 which is equal to half of the angle between the optical axes of the objective and ocular, see Fig. 2. The prism C is arranged so that its reflecting surface 30 lies in one plane substantially at right angles to the reflecting surface 27 of the prism A, and the prism C is secured to or arranged parallel with the other portion of the face 33 of the prism B, so that the face 37 of the prism C is secured to or arranged parallel with the face 33 of the prism B. The outer edge 38 of the face 37 of the prism C is arranged at an angle to the edge 35 of the prism B, which is equal and opposite to that formed between the edges 34 and 35. Consequently, the prisms A and C will be arranged at an angle to each other equal to that between the optical axes of the objective and ocular, and each of the prisms A and C will be arranged at half of this angle to the prism B.

In the construction shown in Figs. 1 to 3 inclusive, the three prisms are secured together, but it is not necessary that the prisms be secured together, or mounted in close proximity to each other, since the prisms A and C may be arranged at any desired or convenient distances from the prism B. For the sake of convenience, in fitting the parts together, a portion of the prism C is cut off, as indicated at 39, to facilitate the securing of the prisms together in a compact manner.

As is the usual practice in connection with optical instruments, the face 40 of the prism A is preferably arranged at right angles to the optical axis of the objective, and the opposite face 41 of the prisms C may also be arranged at right angles to the optical axis of the ocular, in which case the prism B will be inclined with reference to the wall 26 of the prism housing. In order to hold the prism B in correct position, a wedge-shaped block or support 43, which may, if desired, be of glass or other material, may be placed between a triangular face of the prism B and the wall 26 of the prism housing. The prism B and the spacing wedge, together with the prisms A and C secured to the prism B, may be held in place on the prism housing in any suitable or desired manner, for example, by means of a pair of clamping screws 45 and 46 and a cross bar 47 engaging a triangular face of the prism B and pressed against the prism B by means of the clamping screws.

The prism housings, when used in connection with a binocular microscope, may each be secured to a member 48 journalled to rotate about the optical axis of the objective, the two members 48 having gear teeth 49 which mesh to cause equal movements of the members 48, the prism housings and the eye piece tubes, to adjust these tubes for pupillary distances.

In the construction shown in Figs. 1 to 3 inclusive, the angle between the optical axes of the objective and ocular is determined by the angular relations between the three prisms. It is, however, possible to embody the invention shown in these figures in an instrument in which the optical axis of the ocular may be adjusted to various angles, as desired, with reference to the optical axis of the objective, and Figs. 4 to 9 disclose a mounting of prisms similar to those shown in Figs. 1 to 3 in such a manner as to make this adjustment possible. In this construction, the prisms $A^1$, $B^1$ and $C^1$ are arranged so as to reflect image forming rays from the optical axis of the objective, indicated at 51. The prism $A^1$ is mounted in a housing 53 secured on an objective support 54 in any suitable or desired manner. The prism $B^1$ is mounted in a housing 55 and the prism $C^1$ is mounted in a housing 58, which is rigidly secured to the eye piece tube 59.

In order to produce a reflection of the image forming rays from the objective to the ocular without producing a turning of the image about the optical axis of the instrument, it is necessary to arrange the housings of the prisms $C^1$ and $B^1$ in such a manner with reference to the housing of the prism $A^1$ that whenever the prism $C^1$ is turned with the ocular through an angle to the objective, the prism $B^1$ will be turned through one half of such angle, the prism $A^1$ remaining in fixed relation to the objective. In order to accomplish this result, the housings of the three prisms are connected to produce this relative movement. The housings 53 and 58 of the prisms $A^1$ and $C^1$ each have gears 60 and 61 rigidly secured thereto, the two gears being in mesh so that the housing 58 can swing about the housing 53, which is relatively fixed. The housing 55 of the prism $B^1$ constitutes a link connecting the two housings 53 and 58 to permit the housing 58 to swing about the housing 53 and to cause the gears to remain in mesh. For this purpose, a wall 62 of the housing 55 is provided with bearing apertures therein, within which extensions or trunnions 63 and 64 of the housings 53 and 58 respectively bear, the apertures also providing for the passage of light from one housing to another. Since the gears 60 and 61 are of the same pitch diameter, it will follow that the turning of the housing 58 with the gear 61 secured thereto through any angle will result in the turning of the housing 55 through one-half of this angle relatively to the fixed housing 53.

The prism or reflector housings with their gear and pivotal connections may be swung to different angular relations with regard to each other for adjusting the eye piece tubes 59 for pupilary distances, by mounting the housings 53 on bearing plates 67, each having gear teeth 68 arranged concentric with the optical axes of the objectives, the gears of the two plates 67 meshing so that these plates may turn with the housings 53 secured thereto about the objective tubes 69.

By means of the construction described, the optical instrument can be readily adjusted, so that the eye piece may occupy any desired angular relation to the objective. Since turning of the image about the optical axis of the instrument is avoided by the arrangement of the reflecting surfaces, it is consequently unnecessary that both of the eye pieces be adjusted to exactly the same angular relation to their objectives. The drawing illustrates the invention as applied in Figs. 4 to 9 to a binocular microscope having two objectives, but it will be obvious that the same principle may be applied to a monocular or mon-objective binocular microscope or other optical instrument.

Figs. 10 to 18 inclusive illustrate the use of this invention with a slightly different arrangement of the prisms where the erection of an inverted image is not desired. The construction shown in these figures would result if the prisms $A^1$ and $C^1$ contained in the prism housings 58 and 53 respectively, were turned through angles of approximately 90° in a counter-clockwise direction in Fig. 7, which would, of course, necessitate a disconnection of the gears 60 and 61 from each other, while this turning was effected. Figs. 10 to 18 also show this invention applied to a single objective microscope, which may be used with a binocular or monocular eye piece. In these figures, $A^2$, $B^2$ and $C^2$ represent the prisms which permit of an inclination of the eye pieces 75 to different angular relations with reference to the objective 76.

The prism $A^2$ is held in fixed relation to the objective 76 upon a transverse plate 78 connecting and supported by two forwardly extending spaced side pieces 79, which are rigidly secured to an arm 80 of the microscope. The prism $A^2$ is supported upon the plate 78, in the particular construction shown, by means of an upright frame 82 secured to the plate 78 and including an L-shaped clamping member 83 secured, for example, by means of a clamping screw 84. Any other means for supporting the prism $A^2$ on the arm 80 of the microscope may, however, be employed, if desired.

Each of the side plates 78 is provided at its front extremity with an upwardly facing gear segment 85, which may, for example, be formed integral with the side plate 78, and the gear segments 85 mesh with corresponding gear segments 87 which are rigidly connected with the prism $C^2$. The gears 87, in the construction shown, are carried on laterally offset and forwardly extending arms 89 of a body supporting block or member 90, which forms a support for the eye piece tube 75, and which is detachably secured to the block 90 in any suitable manner, so that a body having a binocular eye piece may be replaced by one having a monocular eye piece. The laterally projecting arms 89 are connected by a transverse plate 92, upon which the prism $C^2$ is mounted in any suitable manner, as by means of a depending frame 93, which includes an L-shaped clamping member 94 secured to the frame 93 by a clamping screw 95 for holding the prism $C^2$ in correct relation on the frame 89.

The prism $B^2$ is mounted at the inner side of one of a pair of forwardly extending arms 98 which are disposed so as to extend between the block 90 and the spaced arms 79 before described. The prism $B^2$ is secured to said arm 98 by means of an L-shaped bracket 99 fastened to the inner face of the arm, the prism being rigidly connected to the bracket by means of a clamping bar 100, through which a pair of screws 101 pass and operatively engage in the bracket 99.

At the outer side of each of the arms 79, there is disposed a connecting link or plate 102. These plates 102 are formed with a pair of holes 103 for the reception of the heads of pivot screws 104, which pass through said plates and through bearing holes 106 and 107, formed in the gear segments 85 and 87 respectively. The threaded ends of said screws 104 engage in threaded holes in the forward portions of the aforementioned arms 98.

By this construction, the prisms $B^2$ and $C^2$ can be adjusted relatively to the stationary prism $A^2$, so as to permit the body 91 and the eye piece or pieces 75 carried thereby, to be moved to different angular relations to the objective 76. In this movement the plates 102 and the forward portions of the arms 98 act as links in a manner similar to the housing 55 of the construction shown in Figs. 4 to 9. In this movement, the rotation of the gear segments 87 about the gears 85 will cause the prism $B^2$ carried by the arms 98 to swing through half the angle through which the prism $C^2$ is adjusted.

In order to enclose the prisms and their mountings and provide a finished appearance to the microscope, and also to exclude dust from the aforementioned parts, the plate 92 is provided with a downwardly and forwardly curved portion 110, and preferably the rear ends of the plates 98 are also connected by a transverse dust guard or plate 111. In order to further enclose the parts when in the rearwardly inclined position shown in Figs. 14 and 17, a plate 112 is secured to the forwardly extending portions of the arms 98 and disposed concentrically with the plate 110. The plates 110 and 112, as well as the plate 78 are provided with openings to permit the passage of the image forming rays from the objective to the prisms.

The movable side arms 98 and the body supporting block 90, and the prisms B² and C² carried by these members may be secured in adjusted position by a suitable clamping screw or rod 114, journalled in one of the stationary side arms 79 and having threaded engagement with the other. The screw when tightened causes said parts to frictionally engage and bind one against another.

From the foregoing description, it will be clear that in either of the forms shown in Figs. 4 to 18, the eye piece tube may be swung into various angular relations to the objective without turning or otherwise changing the position of the image as seen through the eye piece. This invention may, of course, be applied to many other types of optical instruments, the three instruments shown being merely illustrative of some embodiments of this invention.

It will be noted that in the constructions shown in Figs. 1 to 9 inclusive, the light rays from the object are reflected by the first pair of reflectors in a direction at 90° plus half of the desired angle from the direction of the optical axis of the objective. The rays are then reflected in the opposite direction by the next pair of reflectors through 90° less half of the desired angle, and thus pass into the ocular. This erects the inverted image at the same time. In the construction shown in Figs. 10 to 18, the first pair of reflectors direct the light rays at an angle to the objective equal to half of the desired angle, and the second pair of reflectors direct the rays through the other half of the desired angle into the ocular. This does not erect an inverted image.

I claim as my invention:

1. In an optical instrument, the combination of an ocular lens and an objective lens arranged with their axes at an angle to each other, and a series of reflecting surfaces between said lenses to reflect the image from the objective into the ocular, including a pair of reflecting surfaces which bend the light from the axis of the objective to an angle thereto, and a second pair of reflecting surfaces which further bend the light and rectify the turning of the image caused by the first pair of reflecting surfaces.

2. In an optical instrument having an objective, means for directing image forming rays from the objective to an observer along a path at an angle to the axis of said objective, said means including reflecting surfaces arranged to receive an image from the objective and diverting said image through part of the required angle and which also turn said image, and a second pair of reflecting surfaces arranged to receive the image from said first mentioned reflecting surfaces and by which said diverted image is further diverted to the required angle and which also rectifies said turning the image by said first reflecting surfaces.

3. A microscope including an objective, a body portion having an eye piece mounted thereon, means for swinging said body portion to different degrees of angular relation to the optical axis of said objective, and reflecting means moved into different operative positions relatively to said objective and body portion by adjustment of said body portion.

4. An optical instrument including a single objective, a binocular body portion including an ocular and movable to different degrees of angular relation to the optical axis of said objective, and a series of reflectors, at least one of which is adjustable with said ocular to reflect light from said objective to the ocular in all positions of said ocular relatively to said objective.

5. An optical instrument including an objective, an ocular movable to different degrees of angular relation to said objective, a first reflector held in fixed relation to said objective, a final reflector connected with said ocular, intermediate reflecting means for reflecting light from said first reflector to said final reflector, and means connecting said ocular and intermediate reflecting means to move the same relatively to said ocular in accordance with movements of said ocular.

6. An optical instrument including an objective, an ocular movable to different degrees of angular relation to the optical axis of said objective, and a series of reflectors adjustable relatively to each other and with said ocular about axes parallel with the direction of rays of light to and from certain of said reflectors to reflect light from said objective to the ocular.

7. An optical instrument including an objective, an ocular movable to different degrees of angular relation to said objective, a series of reflectors for reflecting light from said objective to said ocular, one of said reflectors being held in fixed relation to said objective and another reflector being held in fixed relation to and movable with said ocular, and an intermediate reflector for reflecting light from said other reflector to said first mentioned reflector and movable through one half of the angular displacement of said ocular.

8. The combination of a first reflector receiving and reflecting rays from an object, a final reflector for reflecting the rays at an angle to rays impinging upon said first reflector, and an intermediate reflecting element for reflecting said rays from said first to said final reflector, said first and final reflectors being turned about axes parallel to rays passing to and from the same and said intermediate reflecting element, to equal and opposite angular relations to said intermediate reflecting element.

9. The combination of a first reflector receiving and reflecting rays from an object, a final reflector for reflecting the rays at an angle to rays impinging upon said first reflector, an intermediate reflector for reflecting said rays from said first to said final reflector, means for permitting relative rotation of said first and final reflectors about axes parallel to the direction of rays passing to and from the same and said intermediate reflector, and means for maintaining said first and final reflectors at all times in equal and opposite angular relation about said axes relatively to said intermediate reflector.

10. The combination of a first reflector receiving and reflecting rays from an object, a final reflector for reflecting the rays at an angle to rays impinging upon said first reflector, an intermediate reflector for reflecting said rays from said first to said final reflector, means for permitting relative rotation of said first and final reflectors about axes parallel to the direction of rays passing to and from the same and said intermediate reflector, means for securing said first reflector in relatively fixed position, and means for rotating said final and intermediate reflectors about said axes in such a manner that the final reflector turns through twice the angular displacement relatively to the fixed reflector as said intermediate reflector.

11. The combination of a first reflector receiving and reflecting rays from an object, a final reflector for reflecting the rays at an angle to rays entering said first reflector, an intermediate reflector for reflecting said rays from said first to said final reflector, gears rigidly connected to said first and final reflectors and meshing with each other, said gears being of the same pitch diameter, and a member carrying said intermediate reflector and on which said gears are pivoted, the axes of rotation of said gears being parallel to rays passing between said intermediate reflector and said first and final reflectors.

12. The combination of a first reflector receiving and reflecting rays from an object, a final reflector for reflecting the rays at an angle to rays entering said first reflector, an intermediate reflector for reflecting said rays from said first to said final reflector, supports for said first and final reflectors which are connected with each other to turn through equal angles and in opposite directions, and a support for said intermediate reflector which is pivotally connected with said supports for said first and final reflectors.

13. The combination of two pairs of reflecting surfaces arranged to reflect rays of light from an object in a direction at a desired angle thereto and to invert the image of the object, one of said pairs reflecting the rays in a desired plane through an angle from their original direction, of 90° plus one half of said desired angle, and the other pair reflecting the rays leaving said first pair through an angle thereto of 90° minus one half of the desired angle, and thereby counteract the turning of the image about an axis parallel to said rays, resulting from the reflection by said first pair of reflectors.

14. An optical instrument including an objective, a body portion having an eye piece mounted thereon, means for swinging said body portion to different degrees of angular relation to said objective, reflecting means movable with said body portion, reflecting means arranged in fixed relation to said objective, said two reflecting means being movable relatively to each other when said body portion is swung, to reflect light rays from the objective to the eye piece at all positions of said body portion.

15. In an optical instrument including an objective and an ocular arranged at an angle to the objective, the combination of a series of reflectors for reflecting light from said objective to said ocular, including a first reflector for reflecting light laterally with reference to the optical axis of the objective, a second reflecting surface to reflect the pencil of light substantially at right angles, and in such a plane as to cause the image to revolve in one direction around the axis of the pencil, third and fourth reflecting surfaces which together reflect the pencil of light to the ocular and also revolve the image an equal amount and in the opposite direction so that it may be viewed in the true relation to the object.

16. In an optical instrument, the combination of an ocular lens, an objective lens through which an image of an object may be projected into said ocular lens and which lenses are disposed with their axes in angular relation, and a plurality of reflecting surfaces disposed between said lenses for diverting the image from said objective lens along the axis of and into said ocular lens, and said reflecting surfaces being so arranged that said image is first turned in one direction by some of said reflecting surfaces about the axis of the pencil of light passing through the instrument, and is then turned to an equal extent in the reverse direction by other reflecting surfaces, whereby said image appears unturned in the ocular.

17. An optical instrument having an objective and a housing including an ocular, means for varying the inclination of said housing relatively to the optical axis of the objective, and means between the objective and ocular for conducting light from the objective to the ocular during various angles of inclination of the housing relatively to the axis of the objective.

18. A microscope having a relatively stationary objective and an ocular, means for varying the angular relation between the optical axis of the objective and that of the ocular, and a reflecting surface between the objective and ocular having varying angular relations with the axis of the ocular and the axis of the objective, depending upon the angular relations between the objective and ocular.

19. An optical instrument including a relatively fixed objective, an ocular, means mounting said ocular for movement separately from said objective in a direction in which its optical axis moves solely in a plane, and means associated with said ocular and objective for directing light rays from said objective to, and along the optical axis of, said ocular in all the different adjusted positions of said ocular.

20. An optical instrument comprising a relatively fixed objective, an ocular, means mounting said ocular for movement relatively to said objective and in a direction in which its optical axis moves solely in a plane, and means associated with said ocular and objective for directing light rays from said objective, along the optical axis of said ocular, and having a portion adjustable at half the rate of movement of said ocular but concomitantly therewith, to continue such direction in all the different positions of said ocular during said movement.

21. An optical instrument including an objective, an ocular, a series of reflectors interposed between said ocular and said objective for directing light rays from said objective along the optical axis of said ocular, means mounting said ocular for movement about an axis extending crosswise of the optical axis of said objective, and means mounting said reflectors and adjustable to vary the relation of said reflectors to one another and to said ocular and continue the reflections of light rays from said objective along the optical axis of said ocular in different adjusted positions of said ocular without turning the image.

22. A microscope including a pair of objectives, a binocular eye piece movable to different degrees of angular relation to said objective, and reflecting means adjustable relatively to said objectives and eye piece to reflect light from said objectives to said eye piece during various operative positions of said eye piece relatively to said objectives.

HARVEY N. OTT.